July 16, 1929.   H. BUCKNELL, JR., ET AL   1,721,203
POCKET ELECTRIC CIGARETTE AND CIGAR LIGHTING MACHINE
Filed July 23, 1927   2 Sheets-Sheet 1
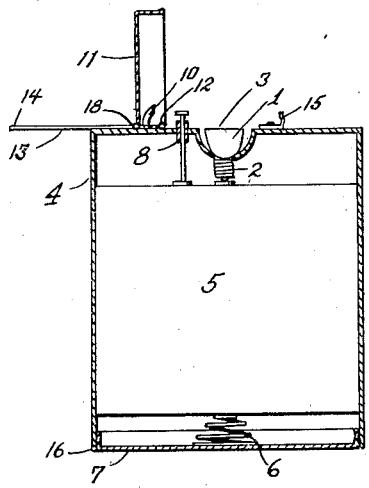
Fig. 1ª
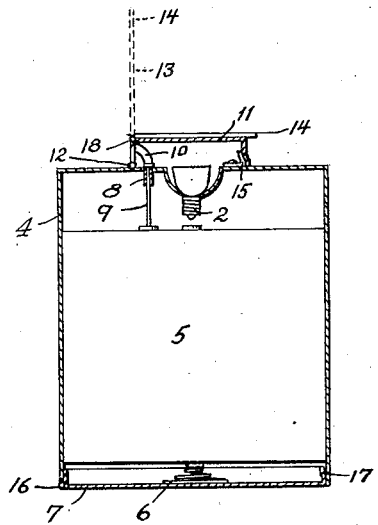
Fig. 1ᵇ
Fig. 2.
Fig. 3.
Inventor
H. Bucknell Jr., S. Chapin and
C. A. McKelvey
By  J. J. Newton
Attorney July 16, 1929.   H. BUCKNELL, JR., ET AL   1,721,203
POCKET ELECTRIC CIGARETTE AND CIGAR LIGHTING MACHINE
Filed July 23, 1927   2 Sheets-Sheet 2
Fig.1ᶜ.
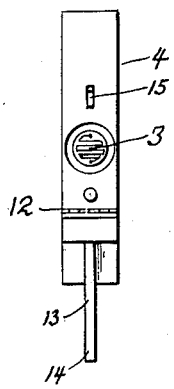
Fig.1ᵃ.
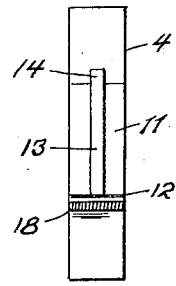
Fig.4ᵃ.
Fig.4ᵇ.
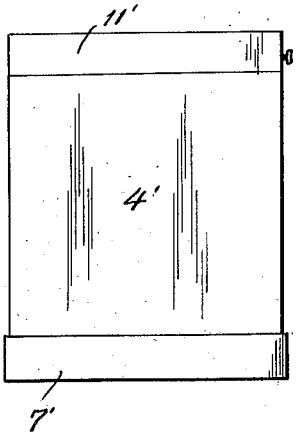
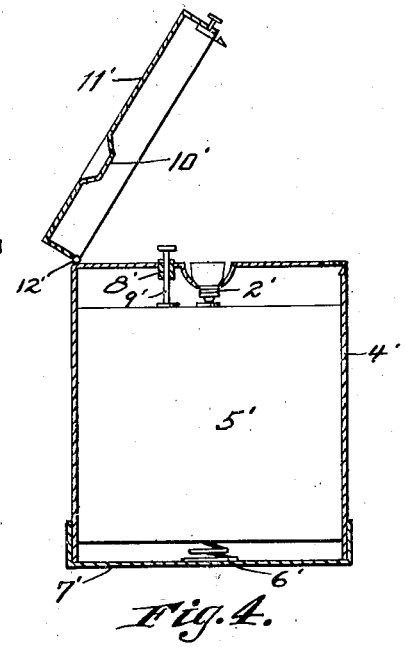
Fig.4.
Inventor
H. Bucknell, Jr., S. Chapin and
C. A. McKelvey
By J. L. Newton
Attorney Patented July 16, 1929.

1,721,203

UNITED STATES PATENT OFFICE.

HOWARD BUCKNELL, JR., SELDEN CHAPIN, AND CARLTON ARTHUR McKELVEY, OF PEKING, CHINA.

POCKET ELECTRIC CIGARETTE AND CIGAR LIGHTING MACHINE.

Application filed July 23, 1927. Serial No. 208,033.

The invention relates to improvements in pocket electric cigarette and cigar lighting machines in which a small dry cell battery is used to heat a small resistance coil of heating wire, to a temperature sufficient to ignite a cigarette or cigar when placed in proximity thereto, and the objects of the improvements are (1) to provide a safe and convenient device for the transmission of the current of the dry cell battery to the coil mentioned above, (2) to provide a method by which worn out coils may be readily replaced, (3) to provide a new method of semi-automatic contact, (4) to provide a new, safe and convenient cover for the heating element to be used in conjunction with the method to provide contact mentioned above.

One form of the invention is illustrated in the accompanying drawing, in which Figure 1ᵃ is a vertical section of the entire machine, Figure 2 is a plan view of the removable heating element, Figure 3 is a view of the cover for the heating element, and Figure 4 shows a slightly modified type of cover, which, however, operates upon the same principle in establishing contact as the cover shown in Figure 3.

In Figure 1 (1) is the porcelain base supporting heating element, in the top of which is built a small coil of fine resistance wire capable of being heated to a dull read heat by the current of a dry cell battery giving three volts. As shown in Figure 2, (2) is a screw base of the Edison type of copper, which screws into a metal-plated socket. (3) is the heating wire, which is arranged in the form of a small coil, as shown in Figure 2. (4) shows the case to hold the dry cell battery, and the heating element, to be manufactured of various metals and materials. (5) shows the dry cell battery inside the case (4). (6) is a simple coil spring attached to the bottom of the case (7) designed for establishing contact as explained below and to hold the battery (5) firmly in position. (7) is the bottom cover of the case, which has a hinge (16) to enable the convenient replacement of dry cell batteries; this case also has a catch (17) to hold cover in place when closed. (8) shows a metal guide, in which plunger (9) slides up and down, and is designed to prevent any play in such plunger. (10) is the plunger hammer, which is built into the lid (11) and is used to force the plunger (9) down upon the battery (5) to break contact when lid is closed. (11) is the lid or cover for the heating element, which when opened, as explained below, releases plunger (9) and allows the battery (5) to be forced up by spring (6), thus completing contact through the spring (6) and base of heating element through the metal case (4). (12) is a hinge, preferably of spring construction, with force enough to close automatically, when released, closing lid and breaking contact by forcing plunger (9) down against battery (5) and compressing spring (6) at bottom of case (7). (13) is a handle, which fits into a groove in the top of the lid (11), and extends slightly at one end beyond edge of lid to enable convenient lifting; this handle is hinged to the lid at the opposite end (18) and, when opened to an angle of ninety degrees to the lid, takes up against the hinge (18), which is allowed to open only to that angle. (14) is the lifter or projection of the handle (13), which extends slightly beyond the edge of the lid, but which is a part of the rigid handle (13). (15) is the spring catch for the lid (11), to ensure that the lid cannot be accidentally opened, and which operates in conjunction with the hinge (12). This spring catch (15) is of the flat steel spring type and is attached to top of case (4) inside lid (11) and when closed fits into lip as shown in Figure 1ᵃ attached, and when open as shown in Figure 1ᵇ attached. (16) is a simple hinge to allow bottom of case (4) to be opened to remove or replace dry cell battery (5). (17) is spring catch for bottom cover (7), which holds the bottom cover tightly closed unless it is desired to open for the purpose of refilling or inspection. (18) is the spring hinge at the end of the handle (13), which returns the handle to the groove in the lid (11) when released, and which is stopped at an angle of ninety degrees to enable the opening of the lid (11).

*General description of operation of lighter.*

The machine having been assembled with heating coil and battery, the projection (14) of the handle (13) is lifted by a flip of the thumb or finger and the handle (13) is lifted back to an angle of ninety degrees to the lid, where the hinge (18) is stopped. The lid (11) is then forced open on the hinge (12) by further pressure on the handle (13) and the plunber hammer (10) is thus lifted clear of the plunger (9), which being so released removes the pressure on battery (5), allowing it to be forced up against the base of the heating element (2) by the spring (6) in the bottom cover (7), thus establishing the circuit in the following order: From top contact of battery (5) to base of center contact of heating element (2), through the coil of resistance wire (3) to Edison base; thence through metal case, to opposite pole of battery through spring (6).

When handle (13) is released, the spring hinge (12) automatically returns the lid (11) to a horizontal position; the plunger hammer (10), forcing the plunger (9) down upon battery (5), sufficiently to depress spring (6) and remove contact between the top of the battery (5) and the base of the heating element (2), thus breaking the electrical circuit. At the same time, spring hinge (18) returns the handle (13) to its groove in the top of the lid (11) and the spring catch (15) engages in the lip on the lid, holding it firmly in place.

Figure 4 shows a modified type of cover (11) for heating element (2). In this type, the spring hinge (12) is reversed and tends to open the lid (11). A strong spring catch is placed on the edge of the lid (11), to hold the top firmly in place, and is released by a push button. In this type, the plunger hammer (10) is of a slightly different shape, as shown in attached drawings, but works on exactly the same principle as in Figure 1.

Although we are not informed as to whether or not pocket electric cigarette and cigar lighters have been manufactured for use with a dry cell battery, we claim:

1. A pocket cigar lighter comprising a casing, a heater and a battery in the casing, a cover for the casing, contacts carried by the battery and heater respectively, and means movable by the cover to move the battery to break the contact when the cover is closed and means in the bottom of the casing to make the contact when the cover is open.

2. An electric cigar lighter comprising a casing, a heater and a battery therein, a spring between the battery and the bottom of the casing to move the battery to complete the circuit, a cover for the casing, means at the top of the battery and projecting through the top of the casing for contacting with the cover when closed and moving the battery against the pressure of said spring to break the contact between the battery and heater.

3. An electric lighter comprising a casing, a heater and battery in the casing, a movable contact carried by the battery, means for breaking the contact and means in the casing for moving the battery to make contact.

HOWARD BUCKNELL, Jr.
SELDEN CHAPIN.
C. A. McKELVEY.